United States Patent Office 2,881,165
Patented Apr. 7, 1959

2,881,165
α-α-DIPHENYL-γ-HEXAMETHYLENEIMINO-
BUTYRAMIDE

Paul A. J. Janssen, Vosselaar, near Turnhout, Belgium, and David K. De Jongh, Heemstede, Netherlands, assignors to N. V. Nederlandsche Combinatie voor Chemische Industrie, Amsterdam, Netherlands, a limited liability company of the Netherlands No Drawing. Application June 18, 1957
Serial No. 666,474

Claims priority, application Netherlands June 29, 1956

1 Claim. (Cl. 260—239)

This invention relates to new parasympathicolytically active α,α-diphenyl propane derivatives and processes for preparing them.

It is known that highly active parasympathicolytics occur in the group of α,α-diphenyl-γ-dialkylamino-butyramides. Sometimes the free aminobutyramides are more active, sometimes the quaternary ammonium salts thereof. In the group of the free aminobutyramides the most active compound has up to the present proved to be the α,α-diphenyl-γ-N-piperidino butyramide.

In other groups also, as for example in the α,α-diphenyl-γ-amino butyronitriles and the α,α-diphenyl-γ-amino propanoles, this preference of the piperidino group is recognized.

It has now been found that compounds of the general formula

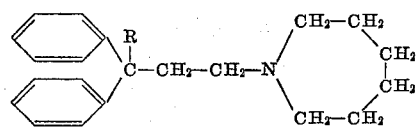

in which R represents a

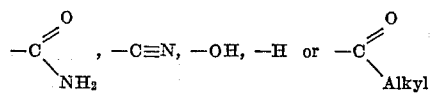

group their acid addition salts with acids containing a non-toxic anion, or their quaternary ammonium salts derived therefrom, are generally more active than the corresponding piperidine derivatives. There also exists a mutual synthetic relation between the above mentioned compounds.

The most important compound of general formula above mentioned is the butyramide, a salt thereof with an acid containing a non-toxic anion or a quaternary ammonium salt derived from such an acid addition salt, which compound excels in its strong parasympathicolytic activity, especially on local administration, and further surpasses all known compounds in respect to this activity. All other compounds of the above formula show some parasympathicolytic activity, while moreover the ketones display a significant analgesic activity. In the following table some pharmacological properties of these compounds are summarized.

| R | Substituent on γ-place [1] | Salt or base | Parasympathicolytic activity [2] | | | Analgesic activity: Morphine=1, dolantine=½ |
|---|---|---|---|---|---|---|
| | | | Mydriasis | | | |
| | | | Ileum | i.p. | local | |
| −C(=O)NH₂ | Hex | base | 1.5 | 1.0 | 2.7 | 0 |
| | | CH₃J | 1.5 | 1.5 | 0 | 0 |
| | Pip | base | 1.0 | 1.0 | 1.0 | 0 |
| | | CH₃J | 1.3 | 3.1 | 0 | 0 |
| −C≡N | Hex | base | 0.4 | ---- | ---- | 0 |
| | | CH₃J | 0.9 | ---- | 0 | 0 |
| | Pip | base | 0.1 | ---- | ---- | 0 |
| | | CH₃J | 0.7 | ---- | 0 | 0 |
| −OH | Hex | base | 0.2 | ---- | 0.06 | 0 |
| | | CH₃J | 0.8 | ---- | 0 | 0 |
| | Pip | base | 0.1 | ---- | 0.03 | 0 |
| | | CH₃J | 0.7 | ---- | 0 | 0 |
| −H | Hex | HCl | 0.05 | ---- | ---- | 0 |
| | | CH₃J | 0.3 | ---- | 0 | 0 |
| | Pip | HCl | 0.05 | ---- | ---- | 0 |
| | | CH₃J | 0.3 | ---- | 0 | 0 |
| −C(=O)C₂H₅ | Hex | ox | 0.02 | ---- | ---- | 1 |
| | Pip | HBr | 0.01 | ---- | ---- | 1 |

[1] Hex represents hexamethyleneimino, Pip represents piperidino.
[2] The activity of atropine=1.

The new compounds can be prepared in a manner known for analogous compounds. Thus the cyanide can be prepared by reaction of a hexamethyleneiminoethyl halide with diphenyl acetonitrile in the presence of a condensing agent such as NaNH₂, or by reaction of α-α-diphenyl-γ-halogenobutyronitrile with hexamethyleneimine. Moreover this cyanide can be obtained from the 1.1-diphenyl-3-hexamethyleneimino propanol-1 via its halide by interaction with an alkali cyanide, whereas the substituted propanol can be obtained from phenyl hexamethyleneiminoethyl ketone by interaction with one mole, and from ethyl hexamethyleneiminobutyrate by interaction with two moles of a phenyl magnesium halide.

The cyanide can be converted into the amide by hydrolysis either with acid (e.g., sulphuric acid) or with other reagents as for example alkali lye.

Starting from the substituted propanol, the 1.1-diphenyl-3-hexamethyleneiminopropane can be prepared by reduction, either by halogenation and reduction, or by dehydration followed by reduction. The 1.1-diphenyl-3-hexamethyleneimino propane can also be obtained from the corresponding nitrile by splitting off the nitrile group with the aid of an excess of sodium amide or a large excess of an alkyl magnesium halide, whereas the ketones can be obtained from the corresponding nitrile by careful interaction with an alkyl magnesium halide.

The new compounds can be employed as medicines, and the amide especially can be used as a local mydriatic, whereas the other compounds of this series are moreover important as intermediates in the production of the amide.

The invention will be further explained by reference to the following examples:

Example 1

To a suspension of 7 grams of sodium amide in 100 cc. of benzene a solution of 33 grams of diphenyl acetonitrile in 80 cc. of benzene was slowly added whilst stirring at a temperature of 30° C.–35° C. Upon termination of the addition the mixture was boiled under reflux for 45 minutes. After cooling 28 grams of hexamethyleneiminoethyl chloride in 40 cc. of xylene were dropwise added (temperature again 30° C.–35° C.) and thereupon boiled under reflux for three hours. The mixture was then cooled, washed with water, extracted with hydrochloric acid and the extract made alkaline with sodium hydroxide and then extracted with ether, which was evaporated after drying. The residue was recrystallized from petroleum ether. The yield amounted to 37 grams of α,α-diphenyl-γ-hexamethyleneimino butyronitrile, M.P. 52° C.–55° C. The methiodide melts at 185–186° C. under decomposition.

*Example 2*

19.0 grams of hexamethyleneimine and 28.6 grams of α,α-diphenyl-γ-bromo butyronitrile, dissolved in 60 cc. of xylene, were boiled under reflux for 8 hours. The hydrobromic acid salt of hexamethyleneimine which results precipitates and was washed with ether after filtration. The ether and the xylene were united and evaporated on a water bath; the residue was extracted with 3 N hydrochloric acid, the extract made alkaline with 10 N sodium hydroxide and extracted with ether. After drying and evaporation of the ether solution, the residue was recrystallized from petroleum ether. The yield amounted 30 grams. M.P. 52°–55° C.

*Example 3*

20 grams of α,α-diphenyl-γ-hexamethyleneimino butyronitrile were dissolved in 40 cc. of 90 percent sulphuric acid and this solution was boiled under reflux for three hours. The reaction mixture was poured into ice water. This solution was then made alkaline with 10 N sodium hydroxide. The precipitate was filtered, washed with water and recrystallized from isopropanol. The yield amounted to 20 grams of α,α-diphenyl-γ-hexamethyleneimino butyramide. M.P. 141.5° C.–143.5° C. The methiodide melts at 212° C.–213° C. under decomposition.

*Example 4*

To a solution of 0.6 mole of Grignard-reagent in ether, prepared from 94.2 grams of bromobenzene and 14.6 grams of magnesium, a solution of 39.8 grams (0.2 mole) of β-hexamethyleneimino propionic ethyl ester in 50 cc. of dry ether was added with stirring, whilst the flask was surrounded by a bath which was kept at 0° C. The mixture was stirred for one hour in the cold and thereafter heated under reflux of the solvent for two hours. After this the reaction mixture was cooled and poured into 100 grams of ground ice with stirring, after which 100 cc. of a 25 percent aqueous solution of ammonium chloride were added. Thereupon acetic acid was slowly added whilst cooling and stirring until the solution reacted acid, the precipitated crude 1.1-diphenyl-3-hexamethyleneimino propanol-1 hydrobromide was filtered and washed with ether, then suspended in chloroform and an excess of ammonia was added while shaking the suspension. Inorganic material, which precipitates, was filtered, the aqueous layer was separated from the chloroform layer, and the latter was washed with water and dried on sodium sulphate. After evaporation of the chloroform, the residue was recrystallized a few times from petroleum ether of B.P. 60° C.–80° C. The yield amounted to 45 grams of 1.1-diphenyl-3-hexamethyleneimino propanol-1 having a melting point of 81° C. The methiodide melts at 222° C.–225.5° C. under decomposition.

*Example 5*

To a solution of 0.4 mole of phenyl magnesium bromide in ether, there were added 42.3 grams (0.183 mole) of hexamethyleneimino-ethyl phenyl ketone, dissolved in dry ether, followed by 250 cc. of dry benzene. The temperature of the mixture was slowly raised until all the ether had been driven off, after which the solution was heated to boiling under reflux of the benzene for 6 hours. The reaction mixture was then cooled and a solution of ammonium chloride was added. The benzene layer was washed with water and dried on potassium carbonate, filtered from the potassium carbonate, and the solvent was then evaporated. Recrystallization of the residue from petroleum ether (B.P. 60° C.–80° C.) yielded 44 grams of 1.1-diphenyl-3-hexamethyleneimino propanol-1 with a melting point of 81° C.

*Example 6*

A vigorously stirred suspension of 0.2 to 1 mole of sodium amide in 200 cc. of xylene, in which were dissolved 0.1 mole of α,α-diphenyl-γ-hexamethyleneimino butyronitrile was boiled for twelve hours. Thereupon the excess of sodium amide was decomposed with water and the xylene layer was separated, washed with water and extracted with hydrochloric acid. This acidic extract was made strongly alkaline with concentrated lye and the separated base was extracted with ether. After drying, the ether was evaporated and the 1.1-diphenyl-3-hexamethyleneimino propane distilled in vacuo. The boiling point at 1 mm. mercury was 170° C.–174° C., the refractive index $n_D^{20}=1.5636$, and the density $d_4^{20}=1.009$. From the oil obtained several acid additions and quaternary ammonium salts can be obtained by reaction with acids containing a non-toxic anion or esters thereof. The hydrochloric acid salt, for instance, melts at 189° C.–192° C., the methiodide at 174° C.–177° C. under decomposition.

*Example 7*

To 31 grams of 1.1-diphenyl-3-hexamethyleneimino propanol-1, dissolved in chloroform, an excess of thionyl chloride was added and the mixture was heated under reflux for three hours. Thereupon the reaction mixture was evaporated to dryness under reduced pressure and the residue was recrystallized by dissolving in warm ethanol and diluting this solution with ethyl acetate.

An aqueous solution of the 1.1-diphenyl-1-chloro-3-hexamethyleneimino propane hydrochloride thus obtained was hydrogenated with hydrogen gas in the presence of a buffered palladium-charcoal catalyst at a pressure of 3 atm. The 1.1-diphenyl-3-hexamethyleneimino propane obtained was purified by distillation under reduced pressure. The boiling point at 1 mm. mercury was 170° C.–174° C.

*Example 8*

A mixture of 0.7 mole of 1.1-diphenyl-3-hexamethyleneimino propanol-1, 0.9 mole of red phosphorus and 1.15 moles of 47 percent hydroiodic acid in 550 cc. of glacial acetic acid was heated for three hours under reflux. After termination of the reaction the warm solution was filtered through a glass filter, diluted with 1500 cc. water and cooled.

The 1.1-diphenyl-3-hexamethyleneimino propane hydroiodide thereby precipitated was filtered and washed with cold water, then again suspended in water and the base liberated by making strongly alkaline, using sodium hydroxide. The base so liberated was extracted with ether, the ether solution dried on potassium carbonate, and the ether was evaporated. The product obtained was further treated under the same conditions as described in Example 7 and proved to be identical with the product there obtained.

*Example 9*

To an aqueous solution of 1.1-diphenyl-1-chloro-3-hexamethyleneimino propane hydrochloride, obtained according to the first paragraph of Example 7, just sufficient alkali lye was added to decompose the salt and thereafter a slight excess of potassium cyanide was added whilst stirring at a temperature of 30° C. to 40° C.

After a few hours the reaction had ended and the α,α-diphenyl-γ-hexamethyleneimino butyronitrile was allowed to separate, and treated in the same manner as described in Examples 1 and 2.

Example 10

To a cooled solution of 0.2 mole of ethyl magnesium bromide in 75 cc. of dry ether a solution of 0.14 mole of α,α-diphenyl-γ-hexamethyleneimino butyronitrile in 150 cc. of dry xylene was added and slowly heated to boiling under reflux of the xylene, during which the ether was evaporated. The solution was boiled for four hours and the boiling mixture was poured into 30 cc. of a 30 percent solution of hydrochloric acid. Most of the xylene was expelled by the heat of reaction and the acidic aqueous solution was heated for another two hours on a steam bath. The solution was left to cool and thereafter 150 cc. of benzene were added. After shaking of the mixture three layers were formed, from which the middle one was separated and made alkaline with sodium hydroxide solution. Thereby an oil precipitated, which was extracted with ether, after which the collected ether extracts were dried on potassium carbonate, the ether evaporated and the residue distilled under reduced pressure. The 4.4-diphenyl-6-hexamethyleneimino hexanon-3 obtained boils at a pressure of 1–1.5 mm. mercury at 201° C.–203° C. and has a refractive index $n_D^{20}=1.5654$. The oxalate of this ketone melts at 152° C.–156° C. under decomposition. The yield amounted to 42 grams (0.12 mole).

What we claim is:

α,α-Diphenyl-γ-hexamethyleneiminobutyramide.

References Cited in the file of this patent

UNITED STATES PATENTS

| | | |
|---|---|---|
| 2,446,522 | Bockmuhl et al. | Aug. 10, 1948 |
| 2,666,050 | Diamond et al. | Jan. 12, 1954 |
| 2,759,926 | Reppe et al. | Aug. 21, 1956 |
| 2,769,812 | Ruddy | Nov. 6, 1956 |

FOREIGN PATENTS

| | | |
|---|---|---|
| 503,236 | Canada | May 25, 1954 |

OTHER REFERENCES

Cheney et al.: J. Org. Chem., vol. 17, page 770 (1952).

UNITED STATES PATENT OFFICE
Certificate of Correction

Patent No. 2,881,165 April 7, 1959

Paul A. J. Janssen et al.

It is hereby certified that error appears in the above numbered patent requiring correction and that the said Letters Patent should read as corrected below.

In the grant, lines 3 to 5, for "assignors to N. V. Nederlandsche Combinatie voor Chemische Industrie, of Amsterdam, Netherlands, a limited liability company of the Netherlands," read —assignors to N. V. Nederlandsche Combinatie voor Chemische Industrie, of Amsterdam, Netherlands, a limited liability company of the Netherlands, and Laboratoria Pharmaceutica Dr. C. Janssen N. V., of Turnhout, Belgium, a limited liability company of Belgium,—; lines 14 and 15, for "N. V. Nederlandsche Combinatie voor Chemische Industrie, its successors" read —N. V. Nederlandsche Combinatie voor Chemische Industrie, and Laboratoria Pharmaceutica Dr. C. Janssen N. V., their successors—; in the heading to the printed specification, lines 5 to 8, for "assignors to N. V. Nederlandsche Combinatie voor Chemische Industrie, Amsterdam, Netherlands, a limited liability company of the Netherlands" read —assignors to N. V. Nederlandsche Combinatie voor Chemische Industrie, Amsterdam, Netherlands, a limited liability company of the Netherlands, and Laboratoria Pharmaceutica Dr. C. Janssen N. V., Turnhout, Belgium, a limited liability company of Belgium—.

Signed and sealed this 15th day of September 1959.

[SEAL]

Attest:
KARL H. AXLINE,
*Attesting Officer.*

ROBERT C. WATSON,
*Commissioner of Patents.*